United States Patent
Tsai

(10) Patent No.: US 6,663,076 B1
(45) Date of Patent: Dec. 16, 2003

(54) SEAT POST CUSHIONING MECHANISM

(76) Inventor: Suei Der Tsai, P.O. Box 63-99, Taichung (TW), 406

( * ) Notice: Subject to any disclaimer, the term of this patent is extended or adjusted under 35 U.S.C. 154(b) by 0 days.

(21) Appl. No.: 09/392,542

(22) Filed: Sep. 9, 1999

(51) Int. Cl.[7] .............................................. F16M 13/00
(52) U.S. Cl. ...................... 248/575; 248/578; 248/561; 248/600; 248/624; 297/195.1
(58) Field of Search ................................. 248/599, 575, 248/578, 561, 600, 601, 624; 280/283; 297/195.1

(56) References Cited

U.S. PATENT DOCUMENTS

| | | | | |
|---|---|---|---|---|
| 4,736,983 A | * | 4/1988 | Furbee .................... | 248/600 X |
| 4,997,232 A | * | 3/1991 | Johnsen ..................... | 248/601 |
| 5,024,413 A | * | 6/1991 | Papp ...................... | 248/601 X |
| 5,062,617 A | * | 11/1991 | Campbell ................ | 248/600 X |
| 5,094,424 A | * | 3/1992 | Hartway ..................... | 248/600 |
| 5,167,435 A | * | 12/1992 | Aldi ........................... | 297/201 |
| 5,236,169 A | * | 8/1993 | Johnsen .................. | 248/578 X |
| 5,236,170 A | * | 8/1993 | Johnsen ..................... | 248/578 |
| 5,316,259 A | * | 5/1994 | Pawlykowych et al. .... | 248/601 |
| 5,324,174 A | * | 6/1994 | Diotte ..................... | 248/601 X |
| 5,383,705 A | * | 1/1995 | Voigt ..................... | 248/622 X |
| 5,713,555 A | * | 2/1998 | Zurflush et al. ........... | 248/599 |
| 5,881,988 A | * | 3/1999 | Liu ............................ | 248/601 |
| 5,911,430 A | * | 6/1999 | Wuschke ................ | 248/601 X |
| 6,019,422 A | * | 2/2000 | Taormino et al. ........ | 297/195.1 |

* cited by examiner

Primary Examiner—Leslie A. Braun
Assistant Examiner—A. Joseph Wujciak
(74) Attorney, Agent, or Firm—Browdy and Neimark, P.L.L.C.

(57) ABSTRACT

A seat post includes a tube having a stop secured in the middle portion. A pipe is slidably extended through the stop. A rod is secured to the pipe and has a seat cushion secured on top. A spring may bias the pad to engage with a stop of the tube and to cushion the rod. A bolt is threaded to the tube and engaged with the pad for adjusting the spring force of the pad and the spring against the pipe. A barrel is secured on the tube and one or more studs are engaged between the barrel and the rod for preventing the rod from rotating relative to the barrel.

13 Claims, 3 Drawing Sheets

SEAT POST CUSHIONING MECHANISM

BACKGROUND OF THE INVENTION

1. Field of the Invention

The present invention relates to a seat post, and more particularly to a seat post cushioning mechanism.

2. Description of the Prior Art

Typical seat posts for cycles comprise a seat cushion secured thereon, and a spring engaged between the seat cushion and the seat post for cushioning the seat cushion. However, the spring may not provide a suitable resilience to the seat cushion.

The present invention has arisen to mitigate and/or obviate the afore-described disadvantages of the conventional seat posts.

SUMMARY OF THE INVENTION

The primary objective of the present invention is to provide a seat post for a cycle including a cushioning device for cushioning the seat cushion and for absorbing the shocks and vibrations that may be transmitted to the seat cushion.

In accordance with one aspect of the invention, there is provided a seat post comprising a tube including a lower portion, a middle portion and an upper portion, a stop provided and secured in the middle portion of the tube, a pipe slidably extended through the stop and including a lower portion having a pad secured thereto for engaging with the stop and for limiting a relative movement of the pipe to the tube, a rod including a lower portion secured to the pipe and including an upper portion for supporting a seat cushion, and means for biasing the pad and the lower portion of the pipe to engage with the stop and to cushion the rod.

The biasing means includes a spring received in the lower portion of the tube and engaged with the lower portion of the pipe for biasing the pipe to engage with the stop. A pad is secured to the lower portion of the tube, and a block is secured on the pad and engaged between the pad and the spring. A bolt is threaded to the lower portion of the tube and engaged with the pad for adjusting a biasing force of the pad and the spring against the pipe.

A barrel is further secured on the upper portion of the tube and includes at least one groove formed therein, the lower portion of the rod includes at least one slot formed therein, and at least one stud is engaged with the groove of the barrel and the slot of the rod. The stud includes a slit formed therein for increasing a resilience of the stud. A ring is engaged on the barrel, the stud is extended from the ring. The ring includes a notch formed therein for increasing a resilience of the ring.

At least one pin is engaged into the stud for expanding the stud to engage with the barrel and the rod. The pin includes a frustum-shape and is extended from a ring. The ring includes a notch formed therein for increasing a resilience of the ring. A cap is secured on the barrel, and a bellows type member is disposed between the upper portion of the rod and the cap.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
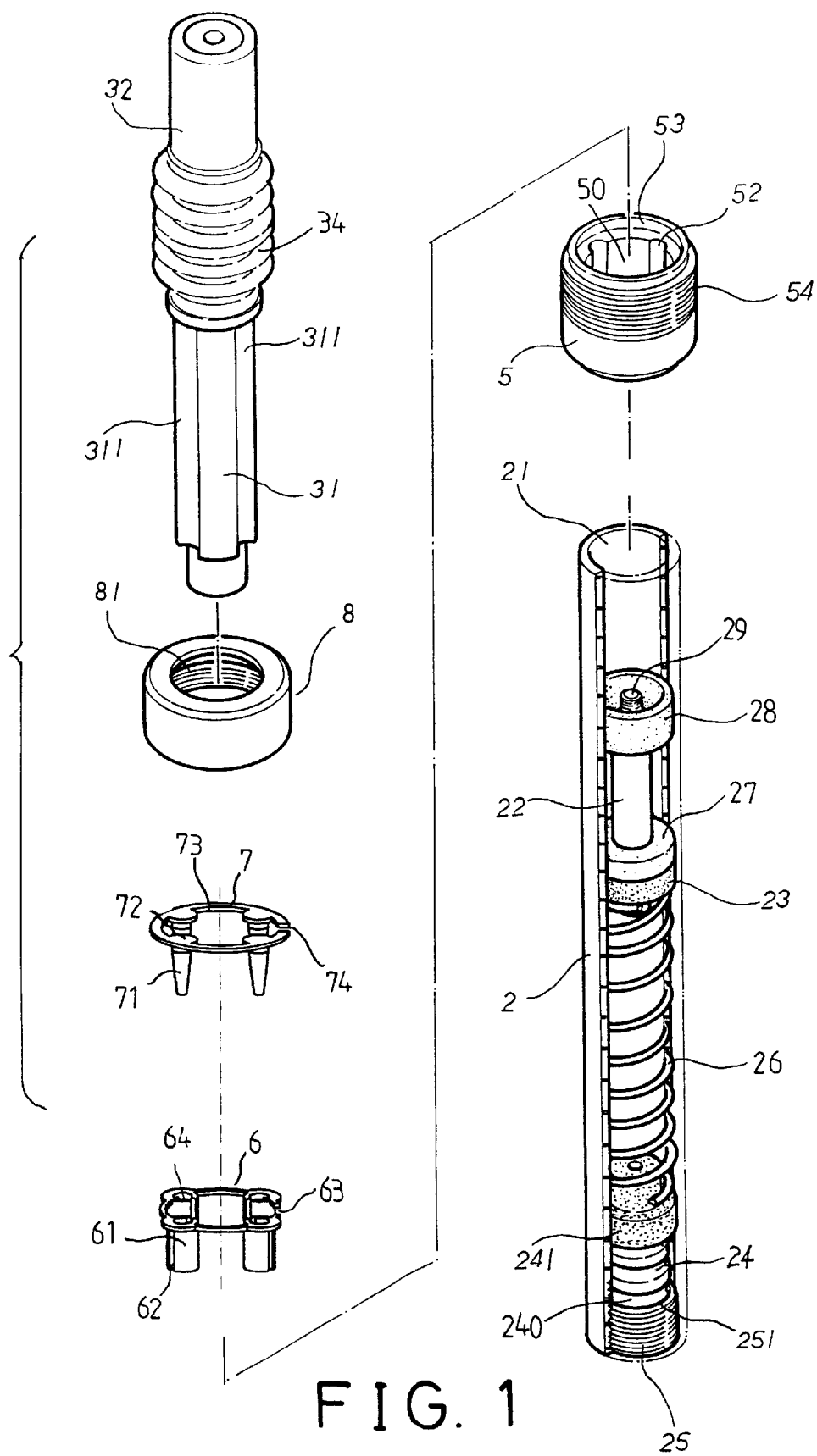
FIG. 1 is an exploded view of a seat post in accordance with the present invention.
Figure 2:
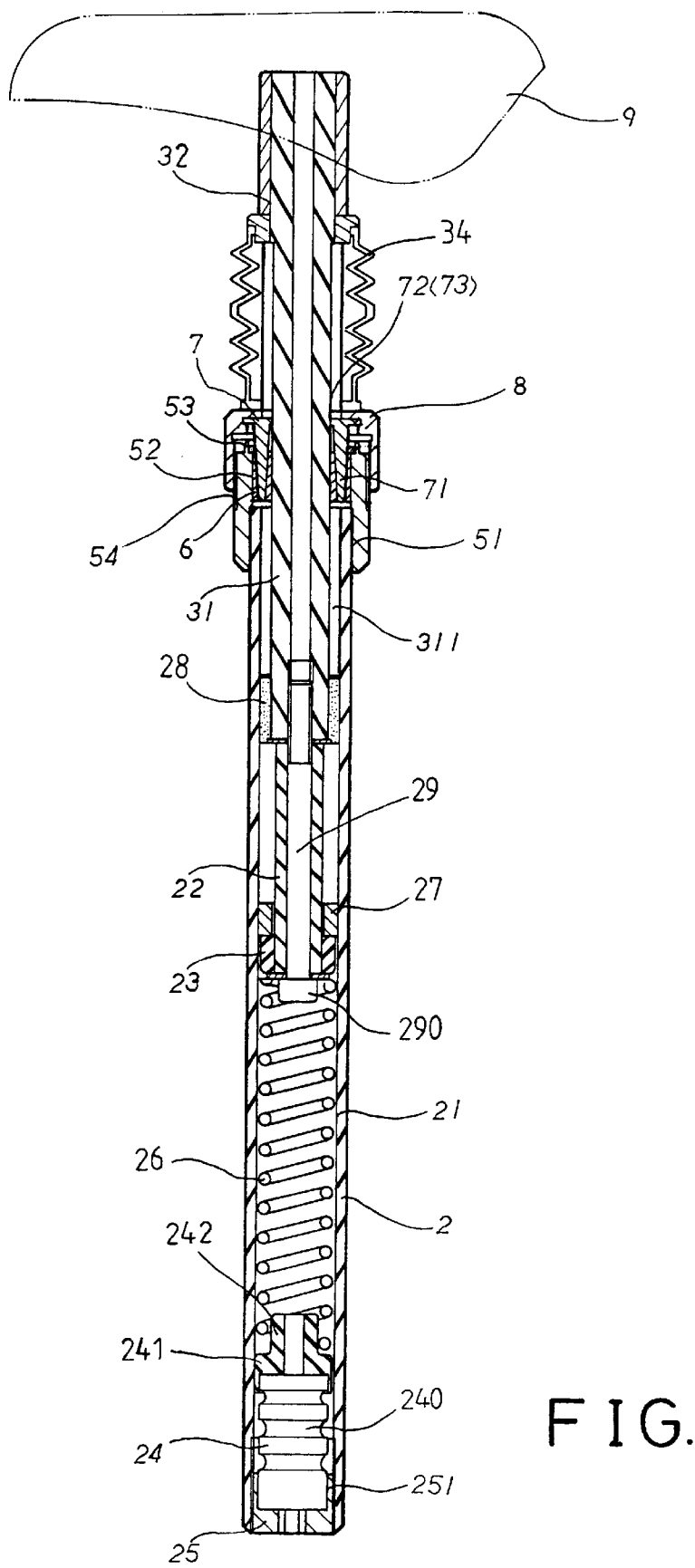
FIG. 2 is a cross sectional view of the seat post.

Referring to the drawings, and initially to FIGS. 1 and 2, a seat post in accordance with the present invention comprises a tube 2 including a bore 21 formed therein and including an inner thread formed in the bottom portion thereof for threading engagement with a bolt 25 which may be adjusted inward and outward of the tube 2 by rotating the bolt 25 relative to the tube 2. The bolt 25 includes a depression 251 formed in the upper portion for receiving a lower end of a pad 24 that is preferably made of resilient rubber or foamable materials. The pad 24 includes one or more annular grooves 240 formed in the outer peripheral portion thereof for increasing the resilience thereof. A block 241 is secured on top of the pad 24 and includes a bulge 242 extended upward therefrom for engaging with a spring 26 and for retaining the spring 26 in place.

The tube 2 includes a stop 27 secured in the middle portion thereof. A pipe 22 is slidably received and engaged through the stop 27. A bolt 29 is engaged through the pipe 22 and includes a head 290 provided in the bottom portion thereof and engaged with the pipe 22. A gasket 23 is secured on the lower portion of the pipe 22 with the head 290 of the bolt 29 for engaging with the stop 27 of the tube 2 and for limiting the sliding movement of the pipe 22 and the bolt 29 relative to the tube 2. The spring 26 is engaged with the lower portion of the pipe 22 and/or the bolt 29 and/or the gasket 23 for biasing the gasket 23 to engage with the stop 27. The threading engagement of the bolt 25 relative to the tube 2 may be used for adjusting the biasing forces of the spring 26 and/or of the pad 24 to the gasket 23 and the pipe 22 against the stop 27.

A rod 31 has a lower portion slidably received in the upper portion of the tube 2 and is threaded with the bolt 29 such that the rod 31 may be solidly secured to the pipe 22 by the bolt 29 and such that the pipe 22 and the rod 31 move in concert with each other. A slide 28 is preferably secured to the bottom portion of the rod 31 for engaging with the stop 27 and for preventing the rod 31 from over-moving downward relative to the tube 2. The rod 31 includes one or more slots 311 formed in the lower portion thereof. A sleeve 32 is secured on top of the rod 31. A seat cushion 9 is secured on top of the rod 31 and the sleeve 32.

A barrel 5 includes an inner thread 51 formed in the bottom portion thereof (FIGS. 2, 3) for threading to the upper portion of the tube 2 and for securing the barrel 5 to the tube 2. The barrel 5 may also be secured to the tube 2 by such as a force-fitted engagement. The barrel 5 includes an outer thread 54 formed thereon and includes an annular shoulder 53 formed in the upper portion thereof and includes one or more vertical grooves 52 formed in the inner peripheral portion thereof and communicating with the bore 50 of the barrel 5. A ring 6 is received in the annular shoulder 53 of the barrel 5 and includes one or more studs 61 extended downward therefrom and engaged into the bore 50 of the barrel 5 and engaged into the grooves 52 of the barrel 5 and engaged into the slots 311 of the rod 31 such that the rod 31 and the studs 61 and the ring 6 may be prevented from rotating relative to the barrel 5. The ring 6 includes a notch 63 formed therein for increasing the resilience of the ring 6. the studs 61 each includes a slit 62 formed through the length thereof for increasing the resilience of the studs 61.

Another ring 7 is engaged on the ring 6 and includes one or more projections 72 extended inward of the orifice 73 thereof and a pin 71 extended downward from each of the projections 72 for engaging into the aperture 64 of the stud 61 of the ring 6. The pin 71 preferably includes a frustum-shape having a lower end of a smaller size for allowing the pins 71 to be easily engaged into the apertures 64 of the studs 61. The pins 71 include a size slightly greater than that of the aperture 64 of the stud 61 for slightly expanding the studs 61 to engage with the barrel 5. A cap 8 includes an inner thread 81 engaged with the outer thread 54 of the barrel 5 for securing the rings 6, 7 in place. A bellows type member 34 is secured between the cap 8 and the sleeve 32 for shielding the upper portion of the rod 31. The ring 7 includes a notch 74 formed therein for increasing the resilience of the ring 7.

Figure 3:
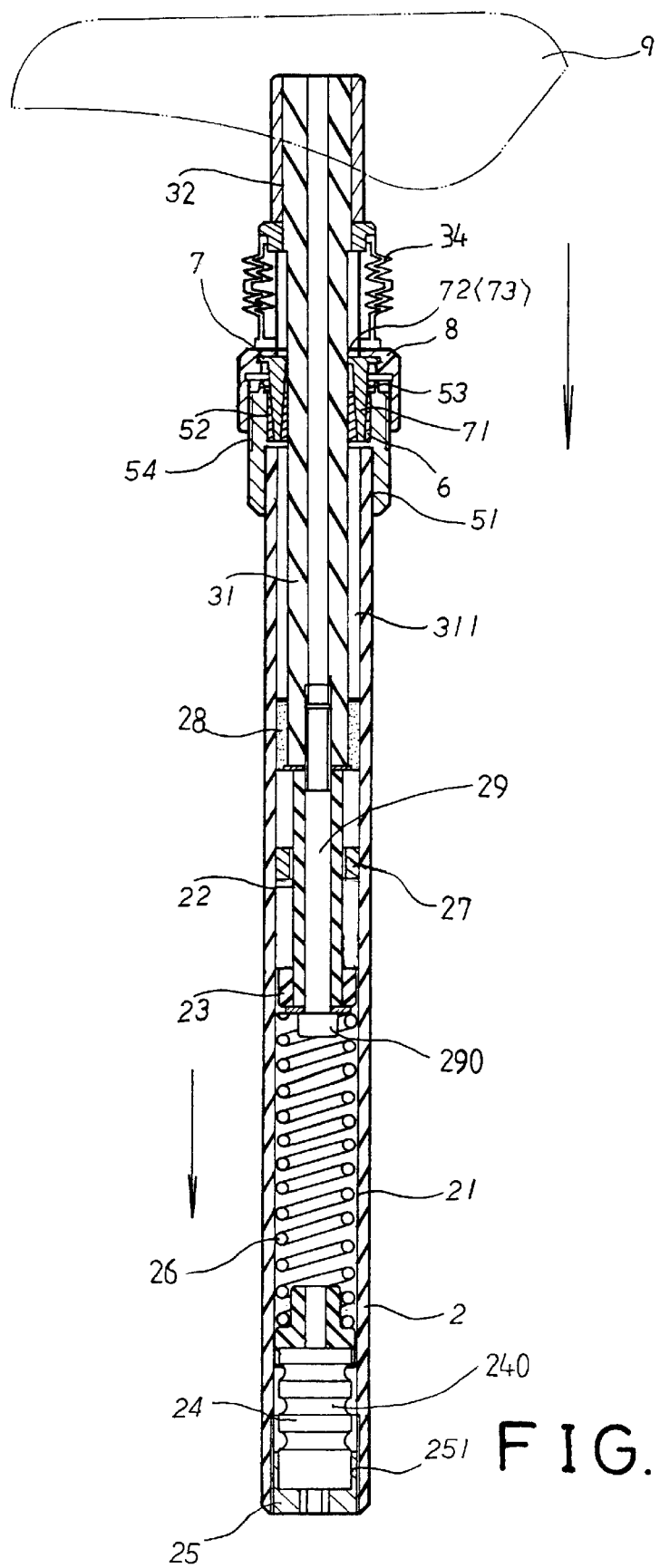
FIG. 3 is a cross sectional view similar to FIG. 2, illustrating the operation of the seat post.

In operation, as shown in FIG. 3, when a user is seated on the seat cushion 9, the rod 31 and the pipe 22 may be forced and moved downward against the spring 26 and the pad 24 which may be used to absorb the shocks and the vibrations that may be transmitted to the seat cushion 9. The pad 23 may be disengaged from the stop 27 when the rod 31 and the seat cushion 9 are moved downward relative to the tube 2. The slide 28 may be used for stably retaining the rod 31 in place and for preventing the rod 31 from being tilted relative to the tube 2. The bellows type member 34 is provided for shielding the upper portion of the rod 31 and for preventing the user from being hurt between the rod 31 and the cap 8 by the relative movement therebetween.

Accordingly, the seat post in accordance with the present invention includes a cushioning device for cushioning the seat cushion and for absorbing the shocks and vibrations that may be transmitted to the seat cushion.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A seat post comprising:
    a tube including a lower portion, a middle portion and an upper portion,
    a stop provided and secured in said middle portion of said tube,
    a pipe slidably extended through said stop and including a lower portion having a pad secured thereto for engaging with said stop and for limiting a relative movement of said pipe to said tube,
    a rod including a lower portion secured to said pipe and including an upper portion for supporting a set cushion,
    means for biasing said pad and said lower portion of said pipe to engage with said stop and to cushion said rod
    a barrel secured on said upper portion of said tube, and means for preventing said rod from rotating relative to said barrel,
    wherein said barrel includes at least one groove formed therein, said lower portion of said rod having at least one slot formed therein, and said means for preventing said rod from rotating relative to said barrel having at least one stud engaged with said at least one groove of said barrel and said at least one slot of said rod, and
    wherein said at least one stud includes a slit formed therein for increasing a resilience of said at least one stud.

2. The seat post according to claim 1, wherein said biasing means includes a spring received in said lower portion of said tube and engaged with said lower portion of said pipe for biasing said pipe to engage with said stop.

3. The seat post according to claim 2 further comprising means for adjusting a biasing force of said spring against said pipe.

4. The seat post according to claim 2 further comprising a pad secured to said lower portion of said tube, and a block secured on said pad and engaged between said pad and said spring.

5. The seat post according to claim 4 further comprising a bolt threaded to said lower portion of said tube and engaged with said pad for adjusting a biasing force of said pad and said spring against said pipe.

6. The seat post according to claim 1 further comprising a ring engaged on said barrel, said at least one stud being extended from said ring.

7. The seat post according to claim 6, wherein said ring includes a notch formed therein for increasing a resilience of said ring.

8. The seat post according to claim 1 further comprising means for expanding said at least one stud to engage with said barrel and said rod.

9. The seat post according to claim 1 further comprising at least one pin engaged into said at least one stud for expanding said at least one stud to engage with said barrel and said rod.

10. The seat post according to claim 9, wherein said at least one pin includes a frustum-shape.

11. The seat post according to claim 9 further comprising a ring, said at least one pin being extended from said ring.

12. The seat post according to claim 11, wherein said ring includes a notch formed therein for increasing a resilience of said ring.

13. The seat post according to claim 1 further comprising a cap secured on said barrel, and a bellows type member disposed between said upper portion of said rod and said cap.

* * * * *